United States Patent
Le et al.

(10) Patent No.: US 12,354,627 B2
(45) Date of Patent: Jul. 8, 2025

(54) HIGHER AREAL DENSITY NON-LOCAL SPIN ORBIT TORQUE (SOT) WRITER WITH TOPOLOGICAL INSULATOR MATERIALS

(71) Applicants: Western Digital Technologies, Inc., San Jose, CA (US); Tokyo Institute of Technology, Tokyo (JP)

(72) Inventors: Quang Le, San Jose, CA (US); Xiaoyong Liu, San Jose, CA (US); Cherngye Hwang, San Jose, CA (US); Brian R. York, San Jose, CA (US); Son T. Le, San Jose, CA (US); Sharon Swee Ling Banh, San Jose, CA (US); Maki Maeda, Fujisawa (JP); Fan Tuo, Fujisawa (JP); Yu Tao, Fujisawa (JP); Hisashi Takano, Fujisawa (JP); Nam Hai Pham, Tokyo (JP)

(73) Assignees: Western Digital Technologies, Inc., San Jose, CA (US); Tokyo Institute of Technology, Tokyo (JP)

(*) Notice: Subject to any disclaimer, the term of this patent is extended or adjusted under 35 U.S.C. 154(b) by 0 days.

(21) Appl. No.: 18/229,785

(22) Filed: Aug. 3, 2023

(65) Prior Publication Data
US 2025/0006221 A1    Jan. 2, 2025

Related U.S. Application Data

(60) Provisional application No. 63/523,750, filed on Jun. 28, 2023.

(51) Int. Cl.
*G11B 5/31* (2006.01)
*G11B 5/127* (2006.01)
(Continued)

(52) U.S. Cl.
CPC ............ *G11B 5/314* (2013.01); *G11B 5/1278* (2013.01); *G11B 5/235* (2013.01); *G11B 5/37* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 5,751,521 | A | 5/1998 | Gill |
| 6,657,823 | B2 | 12/2003 | Kawato |

(Continued)

FOREIGN PATENT DOCUMENTS

| | | |
|---|---|---|
| CN | 111354392 A | 6/2020 |
| JP | 4934582 B2 | 5/2012 |

(Continued)

OTHER PUBLICATIONS

Berry et al. "Melting at dislocations and grain boundaries: A phase field crystal study," Physical Review, vol. B 77, No. 224114, 2008, pp. 224114-1-224114-5, DOI: 10.1103/PhysRevB.77.224114.

(Continued)

*Primary Examiner* — Craig A. Renner
(74) *Attorney, Agent, or Firm* — PATTERSON + SHERIDAN, LLP (57) ABSTRACT

The present disclosure generally relates to a magnetic media drive comprising a magnetic recording head. The magnetic recording head comprises a main pole disposed at a media facing surface (MFS), a shield disposed at the MFS, a spin blocking layer disposed between the shield and the main pole, at least one non-magnetic layer disposed between the main pole and the shield, the at least one non-magnetic layer being disposed at the MFS, and at least one spin orbit torque (SOT) layer disposed over the at least one non-magnetic layer, the SOT layer being recessed a distance of about 20

(Continued)

nm to about 100 nm from the MFS. A ratio of a length of the SOT layer to a thickness of the SOT layer is greater than 1. The at least one SOT layer comprises BiSb.

23 Claims, 7 Drawing Sheets

(51) Int. Cl.
  *G11B 5/235* (2006.01)
  *G11B 5/37* (2006.01)
  *G11B 5/00* (2006.01)

(56) References Cited

U.S. PATENT DOCUMENTS

| | | | |
|---|---|---|---|
| 6,667,861 | B2 | 12/2003 | Gill |
| 6,680,828 | B2 | 1/2004 | Gill |
| 6,906,898 | B2 | 6/2005 | Kawato |
| 7,016,160 | B2 | 3/2006 | Mao et al. |
| 7,242,556 | B2 | 7/2007 | Gill |
| 7,298,595 | B2 | 11/2007 | Gill |
| 7,436,632 | B2 | 10/2008 | Li et al. |
| 7,643,255 | B2 | 1/2010 | Gill |
| 7,697,242 | B2 | 4/2010 | Gill |
| 7,881,018 | B2 | 2/2011 | Gill et al. |
| 8,125,746 | B2 | 2/2012 | Dimitrov et al. |
| 8,174,799 | B2 | 5/2012 | Hoshiya et al. |
| 8,223,464 | B2 | 7/2012 | Yasui et al. |
| 8,553,346 | B2 | 10/2013 | Braganca et al. |
| 8,570,677 | B2 | 10/2013 | Braganca et al. |
| 8,570,689 | B2 | 10/2013 | Sato et al. |
| 8,654,465 | B2 | 2/2014 | Braganca et al. |
| 9,472,216 | B1 | 10/2016 | Mauri et al. |
| 9,806,710 | B2 | 10/2017 | Flatte |
| 9,929,210 | B2 | 3/2018 | Lai et al. |
| 9,947,347 | B1 | 4/2018 | Van Der Heijden et al. |
| 10,014,012 | B1 | 7/2018 | Song et al. |
| 10,127,933 | B2 | 11/2018 | Batra et al. |
| 10,210,888 | B1 | 2/2019 | Li et al. |
| 10,483,457 | B1 | 11/2019 | Lee et al. |
| 10,490,731 | B2 | 11/2019 | Sasaki et al. |
| 10,559,318 | B1 * | 2/2020 | Chen et al. ............. G11B 5/187 |
| 10,580,441 | B1 * | 3/2020 | Chen et al. ............. G11B 5/37 |
| 10,679,650 | B2 * | 6/2020 | Bai et al. ............. G11B 5/235 |
| 10,714,136 | B1 * | 7/2020 | Chen et al. ............. G11B 5/3133 |
| 10,720,570 | B2 | 7/2020 | Le et al. |
| 10,770,104 | B1 * | 9/2020 | Chen et al. ............. G11B 5/37 |
| 10,777,219 | B1 * | 9/2020 | Asif Bashir et al. ....................... G11B 5/1278 |
| 10,839,831 | B1 | 11/2020 | Nguyen et al. |
| 10,867,626 | B1 | 12/2020 | Li et al. |
| 10,891,974 | B1 * | 1/2021 | Chembrolu et al. . G11B 5/1278 |
| 10,891,975 | B1 * | 1/2021 | Bai et al. ............. G11B 5/1278 |
| 10,896,690 | B1 * | 1/2021 | Bai et al. ............. G11B 5/187 |
| 10,991,390 | B2 | 4/2021 | Kobayashi |
| 11,017,801 | B1 * | 5/2021 | Chembrolu et al. ... G11B 5/314 |
| 11,088,200 | B1 | 8/2021 | Xiao |
| 11,094,338 | B1 | 8/2021 | Hwang et al. |
| 11,100,946 | B1 | 8/2021 | Le et al. |
| 11,222,656 | B1 | 1/2022 | Le et al. |
| 11,227,627 | B1 * | 1/2022 | Song et al. ............. G11B 5/235 |
| 11,437,058 | B2 | 9/2022 | Song et al. |
| 11,495,741 | B2 | 11/2022 | York et al. |
| 11,532,323 | B1 | 12/2022 | Le et al. |
| 2009/0161265 | A1 | 6/2009 | Sugano et al. |
| 2011/0089940 | A1 | 4/2011 | Carey et al. |
| 2014/0226239 | A1 | 8/2014 | Mihajlovic et al. |
| 2014/0254252 | A1 | 9/2014 | Guo |
| 2015/0041934 | A1 | 2/2015 | Khvalkovskiy et al. |
| 2015/0287426 | A1 | 10/2015 | Mihajlovic et al. |
| 2017/0077392 | A1 | 3/2017 | Han et al. |
| 2017/0098545 | A1 | 4/2017 | Woodruff |
| 2017/0221506 | A1 | 8/2017 | Tan et al. |
| 2017/0271581 | A1 | 9/2017 | Seong et al. |
| 2017/0288666 | A1 | 10/2017 | Flatte |
| 2017/0365777 | A1 | 12/2017 | Mihajlovic et al. |
| 2018/0166500 | A1 | 6/2018 | Wang et al. |
| 2018/0358543 | A1 | 12/2018 | Le et al. |
| 2018/0366172 | A1 | 12/2018 | Wang et al. |
| 2019/0037703 | A1 | 1/2019 | Wang et al. |
| 2019/0058113 | A1 | 2/2019 | Ramaswamy et al. |
| 2019/0326353 | A1 | 10/2019 | O'Brien et al. |
| 2019/0392881 | A1 | 12/2019 | Rakshit et al. |
| 2020/0035910 | A1 | 1/2020 | Li et al. |
| 2020/0098410 | A1 | 3/2020 | Gosavi et al. |
| 2020/0152228 | A1 * | 5/2020 | Tang et al. ............. G11B 5/232 |
| 2020/0176511 | A1 | 6/2020 | Park et al. |
| 2020/0243603 | A1 | 7/2020 | Lee et al. |
| 2020/0243752 | A1 | 7/2020 | Sasaki |
| 2020/0279992 | A1 | 9/2020 | Pham et al. |
| 2021/0056988 | A1 | 2/2021 | Chen et al. |
| 2021/0249038 | A1 | 8/2021 | Le et al. |
| 2021/0328134 | A1 | 10/2021 | Guo et al. |
| 2021/0336127 | A1 | 10/2021 | Le et al. |
| 2021/0351342 | A1 | 11/2021 | Yui et al. |
| 2021/0367142 | A1 | 11/2021 | Lee et al. |
| 2021/0408370 | A1 | 12/2021 | York et al. |
| 2022/0005498 | A1 | 1/2022 | Le et al. |
| 2022/0013138 | A1 | 1/2022 | Hwang et al. |
| 2022/0029090 | A1 | 1/2022 | Cho et al. |
| 2022/0044103 | A1 | 2/2022 | Nguyen et al. |
| 2022/0068538 | A1 | 3/2022 | Apalkov et al. |
| 2022/0069202 | A1 | 3/2022 | Nguyen et al. |
| 2022/0310901 | A1 | 9/2022 | Oguz et al. |
| 2023/0027086 | A1 | 1/2023 | Le et al. |
| 2023/0047223 | A1 | 2/2023 | Le et al. |
| 2023/0121375 | A1 | 4/2023 | Le et al. |
| 2023/0197132 | A1 | 6/2023 | Le et al. |

FOREIGN PATENT DOCUMENTS

| | | | |
|---|---|---|---|
| JP | 2021034480 | A | 3/2021 |
| JP | 2021057357 | A | 4/2021 |
| JP | 2021128814 | A | 9/2021 |
| WO | 2018231292 | A1 | 12/2018 |
| WO | 2019054484 | A1 | 3/2019 |
| WO | 2019125388 | A1 | 6/2019 |
| WO | 2019159885 | A1 | 8/2019 |
| WO | 2021221726 | A1 | 11/2021 |
| WO | 2023022764 | A1 | 2/2023 |

OTHER PUBLICATIONS

Buffat et al. "Size effect on the melting temperature of gold particles," Physical Review A, vol. 13, No. 6, Jun. 1976, pp. 2287-2298.

Cantwell et al. "Grain boundary complexions," ScienceDirect, Acta Materialia, vol. 62, No. 152, 2014, pp. 1-48, http://dx.doi.org/10.1016/j.actamat.2013.07.037.

Chi et al. "The Spin Hall Effect of Bi—Sb Alloys Driven by Thermally Excited Dirac-like Electrons," Oct. 28, 2019, ArXiv: 1910, 40 pages, https://arxiv.org/pdf/1910.12433.pdf.

Eustathopoulos "Wetting by Liquid Metals-Application in Materials Processing: The Contribution of the Grenoble Group," Metals, 2015, vol. 5, No. 1, pp. 350-370, doi:10.3390/met5010350.

Fan et al. "Magnetization switching through giant spin-orbit torque in a magnetically doped topological insulator heterostructure," Nature Materials, vol. 13, Apr. 28, 2014, pp. 669-704, <<https://doi.org/10.1038/nmat3973>>.

Frolov et al. "Structural phase transformations in metallic grain boundaries," Nature Communications, 2013, vol. 4, No. 1899, pp. 1-7, DOI: 10.1038/ncomms2919.

International Search Report and the Written Opinion for International Application No. PCT/US2020/065156 mailed Mar. 14, 2021, 13 pages.

International Search Report and the Written Opinion for International Application No. PCT/US2020/066902 mailed Apr. 18, 2021, 12 pages.

Khang et al. "A conductive topological insulator with large spin Hall effect for ultralow power spin-orbit torque switching," Nature

(56) References Cited

OTHER PUBLICATIONS

Materials, vol. 17, pp. 808-813, Sep. 2018, pp. 808-813, https://doi.org/10.1038/s41563-018-0137-y.

Kogtenkova et al. "Grain Boundary Complexions and Phase Transformations in Al- and Cu-Based Alloys," Metals, 2019, vol. 9, No. 1, doi:10.3390/met9010010, 24 pages.

Roschewsky et al. "Spin-orbit torque and Nernst effect in Bi—Sb/Co heterostructures," Physical Review, vol. B 99, No. 195103, 2019, pp. 195103-1-195103-5, DOI: 10.1103/PhysRevB.99.195103.

Roschewsky et al. "Spin-Orbit Torque and Nernst Effect in BiSb/Co Heterostructures," Center for Energy Efficient Electronics Science, University of California—Berkeley, 2018, 12 pages, https://e3s-center.berkeley.edu/wp-content/uploads/2018/11/43Theme-4_Roschewsky_2018E3Sretreat.pdf.

Shao "Spin-Orbit Torques in Topological Insultators," UCLA Electronic Theses and Dissertations; 2015; 76 pages, https://escholarship.org/content/qt3ds9792s/qt3ds9792s.pdf?t=nys1b5&nosplash=32ac004cc5750a361e60ece735dd2752.

Shirokura et al. "Origin of the Giant Spin Hall Effect in BlSb Topological Insulator," ArXiv:1810; 27 pages, https://arxiv.org/ftp/arxiv/papers/1810/1810.10840.pdf, 2018.

Tanaka et al. "Thermodynamic Evaluation of Nano-Particle Binary Alloy Phase Diagrams," 2001, Zeitschrift für Metallkunde, vol. 92, No. 11, pp. 1236-1241, http: //hdl.handle.net/11094/26514.

Walker et al. "Composition-dependent structural transition in epitaxial Bi1-xSbx thin films on Si (111)," Physical Review Materials, vol. 3, 064201, Jun. 7, 2019, 8 pages.

Yao et al. "Influence of Crystal Orientation and Surface Termination on the Growth of BiSb thin films on GaAs Substrates," Accepted Manuscript, Journal of Crystal Growth, 2019, 24 pages, doi: https://doi.org/10.1016/j.jcrysgro.2019.01.041.

U.S. Appl. No. 17/401,856, filed Aug. 13, 2021.

U.S. Appl. No. 17/405,954, filed Aug. 18, 2021.

Teague "X-ray and Mossbauer spectroscopy studies of the silicon-antimony and bismuth-antimony alloys," 1971, Scholar's Mine, Doctoral Dissertations, University of Missouri-Rolla, 167 pages.

"A colossal breakthrough for topological spintronics," Tokyo Institute of Technology, Jul. 31, 2018, 4 pages, <https://www.titech.ac.jp/english/news/2018/042001.html>.

International Search Report and the Written Opinion for International Application No. PCT/US2021/033912 mailed Jul. 25, 2021, 9 pages.

Lau et al. "Spin-orbit torque switching without an external field using interlayer exchange coupling," Nature Nanotechnology, vol. 11, Sep. 2016, pp. 758-762, <https://doi.org/10.1038/nnano.2016.84>.

Liu "Spin-orbit Torque Driven Magnetization Switching for Nonvolatile Memory and Beyond," Carnegie Mellon University, May 2020, Thesis, 157 pages, <https://doi.org/10.1184/R1/11933571.v1>, <https://kilthub.cmu.edu/articles/Spinorbit_Torque_Driven_Magnetization_Switching_for_Nonvolatile_Memory_and_Beyond/11933571/files/21908046.pdf>.

Han et al. "Self-Biased Differential Dual Spin Valve Readers for Future Magnetic Recording," IEEE Transactions on Magnetics, vol. 48, No. 5, May 2012, pp. 1770-1776, 10.1109/TMAG.2011.2169946.

International Search Report and the Written Opinion for International Application No. PCT/US2021/033197 mailed Jul. 12, 2021, 9 pages.

Jabeur et al. "Study of spin transfer torque (STT) and spin orbit torque (SOT) magnetic tunnel junctions (MTJs) at advanced CMOS technology nodes," Electrical and Electronics Engineering: An International Journal, (ELELIJ) vol. 6, No. 1, Feb. 2017, pp. 1-9, 10.14810/elelij.2017.6101.

Yuan et al. "Readback Resolution of Differential Dual CPP Spin Valve Reader," IEEE Transactions on Magnetics, vol. 46, No. 6, Jun. 2010, pp. 1667-1670, 10.1109/TMAG.2010.2045106.

Tuo Fan et al. "Ultrahigh Efficient Spin-Orbit Torque Magnetization Switching in All-Sputtered Topological Insulator—Ferromagnet Multilayer", Jul. 5, 2020, <https://arxiv.org/ftp/arxiv/papers/2007/2007.02264.pdf.

International Search Report and Written Opinion for International Application No. PCT/US2022/027960 dated Sep. 5, 2022.

Zhang et al., "Different types of spin currents in the comprehensive materials database of nonmagnetic spin Hall effect", NPJ Computational Materials, 2021, 167, pp. 1-7, (Year: 2021).

Demasius, Kai-Uwe, et al. "Enhanced spin-orbit torques by oxygen incorporation in tungsten films." Nature communications 7.1 (2016): 1-7.

International Search Report and Written Opinion dated Nov. 16, 2022 for Application No. PCT/US2022/035654.

Manchon, A. et al. "Theory of nonequilibrium intrinsic spin torque in a single nanomagnet", Phys. Rev. B, vol. 78, 212405, Dec. 2008.

* cited by examiner

HIGHER AREAL DENSITY NON-LOCAL SPIN ORBIT TORQUE (SOT) WRITER WITH TOPOLOGICAL INSULATOR MATERIALS

CROSS-REFERENCE TO RELATED APPLICATIONS

This application claims benefit of U.S. provisional patent application Ser. No. 63/523,750, filed Jun. 28, 2023, which is herein incorporated by reference.

BACKGROUND OF THE DISCLOSURE

Field of the Disclosure

Embodiments of the present disclosure generally relate to a magnetic recording head comprising a spintronic device for magnetic media, such as a magnetic media drive or magnetic disk drive.

Description of the Related Art

At the heart of a computer is a magnetic disk drive. Information is written to and read from a disk as the disk rotates past read and write heads that are positioned very closely to the magnetic surface of the disk. Microwave-assisted magnetic recording (MAMR) is a type of energy-assisted recording technology to improve the recording density of a magnetic recording medium.

In MAMR, a spintronic device is located near the write element to produce a high-frequency AC field. The AC field reduces an effective coercivity of a magnetic recording medium, allowing writing at lower magnetic writing fields from the write pole. Due to the lower magnetic writing fields, higher recording density of the magnetic recording medium may be achieved through MAMR. More generally, various energy-assisted recording approaches based on spintronic effects are being explored, and there is a need in the art for improved spintronic devices for use in magnetic recording devices.

SUMMARY OF THE DISCLOSURE

The present disclosure generally relates to a magnetic media drive comprising a magnetic recording head. The magnetic recording head comprises a main pole disposed at a media facing surface (MFS), a shield disposed at the MFS, a spin blocking layer disposed between the shield and the main pole, at least one non-magnetic layer disposed between the main pole and the shield, the at least one non-magnetic layer being disposed at the MFS, and at least one spin orbit torque (SOT) layer disposed over the at least one non-magnetic layer, the SOT layer being recessed a distance of about 20 nm to about 100 nm from the MFS. A ratio of a length of the SOT layer to a thickness of the SOT layer is greater than 1. The at least one SOT layer comprises BiSb.

In one embodiment, a magnetic recording head comprises a main pole disposed at a media facing surface (MFS), a shield disposed at the MFS, a non-magnetic layer disposed between the main pole and the shield, the non-magnetic layer being disposed at the MFS, and a spin orbit torque (SOT) layer disposed over the non-magnetic layer, the SOT layer being recessed a distance of about 20 nm to about 100 nm from the MFS.

In another embodiment, a magnetic recording head comprises a main pole disposed at a media facing surface (MFS), a first non-magnetic layer disposed over the main pole, the first non-magnetic layer being disposed at the MFS, a second non-magnetic layer disposed over the first non-magnetic layer, the second non-magnetic layer being disposed at the MFS, a shield disposed over the second non-magnetic layer, and a spin orbit torque (SOT) layer disposed over the first non-magnetic layer and the second non-magnetic layer, the SOT layer being recessed a distance of about 20 nm to about 100 nm from the MFS.

In yet another embodiment, a magnetic recording head comprises a main pole disposed at a media facing surface (MFS), a first non-magnetic layer disposed over the main pole, the first non-magnetic layer being disposed at the MFS, a spin blocking layer disposed over the first non-magnetic layer, a second non-magnetic layer disposed over the spin blocking layer, the second non-magnetic layer being disposed at the MFS, a trailing shield disposed over the second non-magnetic layer, a first spin orbit torque (SOT) layer over the first non-magnetic layer, and a second SOT layer disposed over the second non-magnetic layer, wherein the first SOT layer and the second SOT layer are each individually recessed a distance of about 20 nm to about 100 nm from the MFS.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive comprising a magnetic recording head. The magnetic recording head comprises a main pole disposed at a media facing surface (MFS), a shield disposed at the MFS, a spin blocking layer disposed between the shield and the main pole, at least one non-magnetic layer disposed between the main pole and the shield, the at least one non-magnetic layer being disposed at the MFS, and at least one spin orbit torque (SOT) layer disposed over the at least one non-magnetic layer, the SOT layer being recessed a distance of about 20 nm to about 100 nm from the MFS. A ratio of a length of the SOT layer to a thickness of the SOT layer is greater than 1. The at least one SOT layer comprises BiSb.

Figure 1:
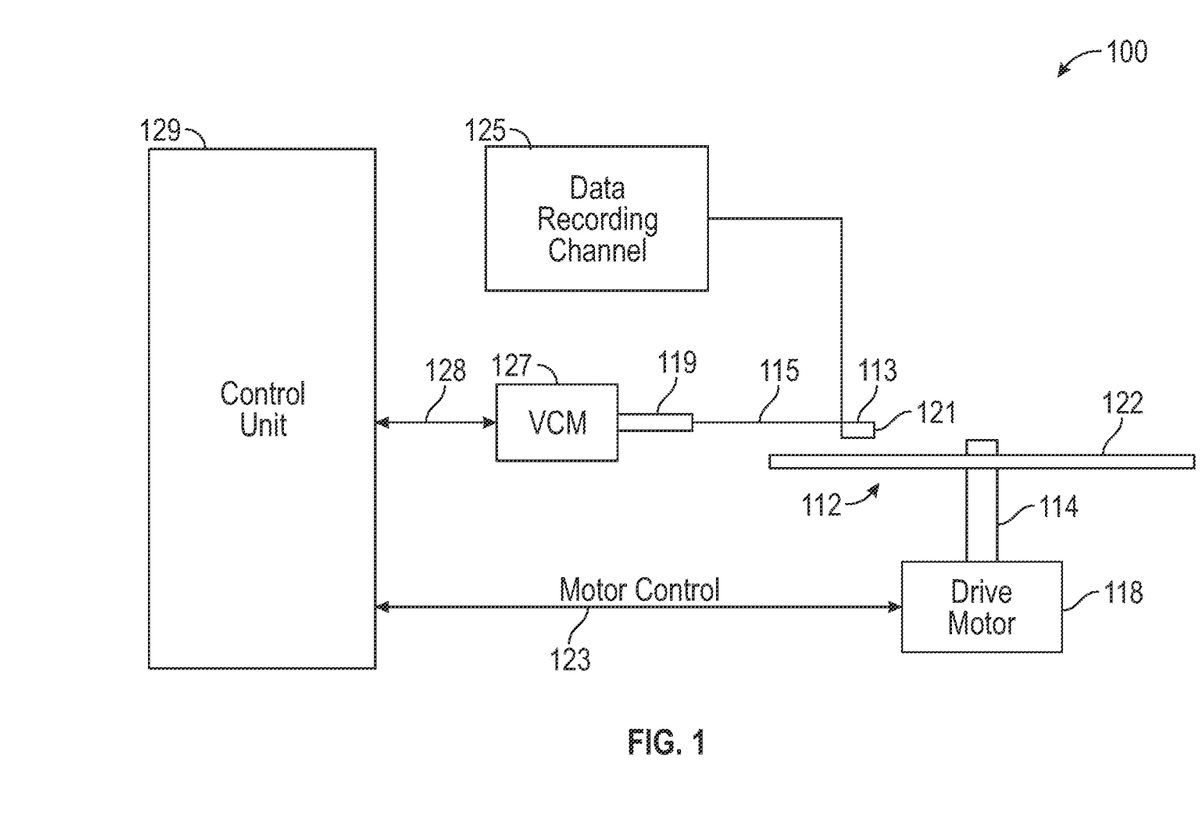
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
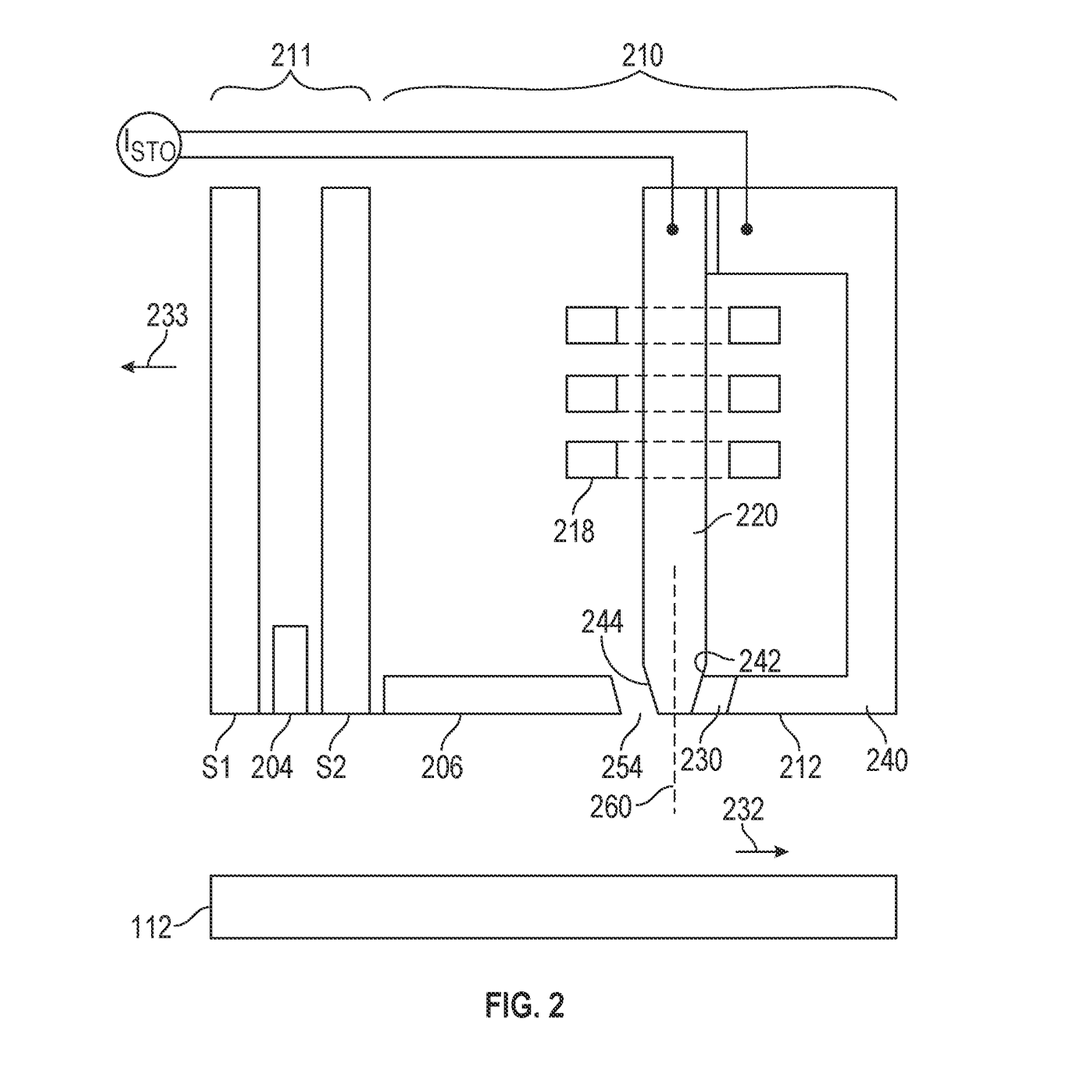
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, an inverse spin hall effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and an optional spintronic device 230 disposed between the main pole 220 and the TS 240. Each of the main pole 220, the spintronic device 230, the leading shield 206, and the TS 240 has a front portion at the MFS. It is noted that while the various embodiments are illustrated with the spintronic device 230 (in the form of SOT based devices) in the gap between the main pole 220 and the TS 240, the spintronic device 230 can be placed between the main pole 220 and other shields of the main pole (e.g., side shield or leading shield). Thus, any mention of trailing shield below can be substituted with other shields such as leading or side shields. Such trailing shield implementations are provided for illustrative examples and not intended to limit the scope of the embodiments.

The main pole 220 includes a magnetic material, such as CoFe, CoFeNi, NiFe, or FeNiRe, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is based on the SHE, and is positioned proximate the main pole 220 to assist the writing. Spin orbit torque (SOT) from a spin Hall effect (SHE) layer or SOT layer causes a spin current in a non-magnetic layer that is contact with the main pole and/or trailing shield, depending on the embodiments. The spin current magnetizes the main pole and/or trailing shield and reduces the write gap field, thus assisting in the switching of the magnetization of the main pole and/or trailing shield, which in turn improves write-ability.

FIGS. 3A-6 illustrate prospective views of write heads 300, 400, 500, 600, according to various embodiments. FIG. 3B illustrates a portion of the write head 300 of FIG. 3A. Each write head 300, 400, 500, 600 may be the write head 210 of FIG. 2, and may be a part of the magnetic recording device 100 of FIG. 1. Aspects of the various write heads 300, 400, 500, 600 may be used in combination with one another.

Figure 3A:
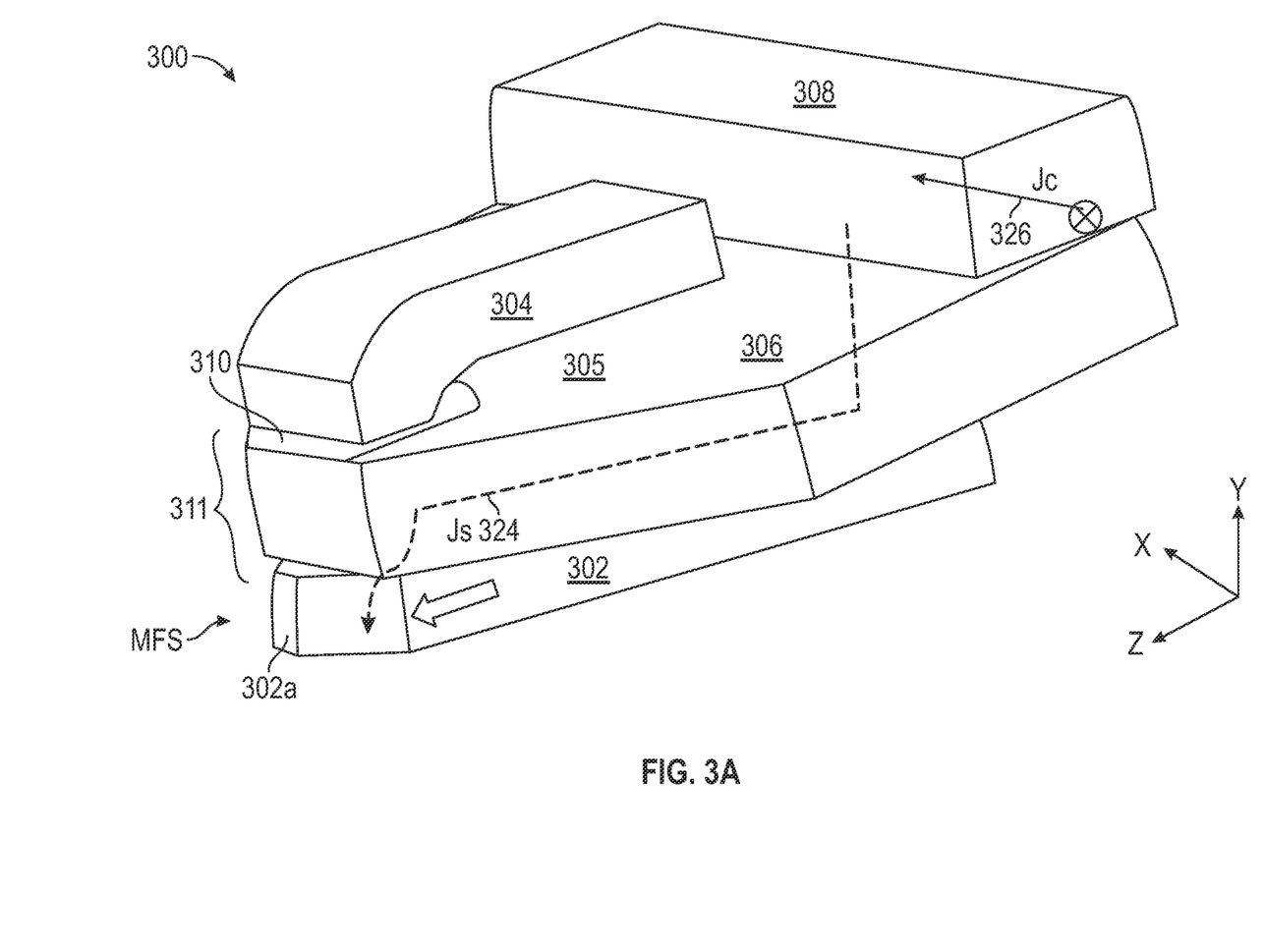
FIG. 3A illustrate prospective views of write heads, according to one embodiment.

The write head 300 of FIG. 3A comprises a main pole 302 extending to the MFS, a trailing shield 304 extending to the MFS, and a non-magnetic (NM) layer 306 disposed between the main pole 302 and the trailing shield 304. The NM layer 306 extends to the MFS and is disposed in a trailing gap 311. A spin blocking layer (SBL) 310, or a spin absorption layer, is disposed between the trailing shield 304 and the NM layer 306 in the trailing gap 311. As such, the trailing shield 304 is spaced from the NM layer 306. In some embodiments, insulating layers (not shown) may be disposed between portions of the trailing shield 304 and the NM layer 306, and/or between the main pole 302 and the NM layer 306. The NM layer 306 may be referred to herein as a non-magnetic spin transport layer 306.

Figure 3B:
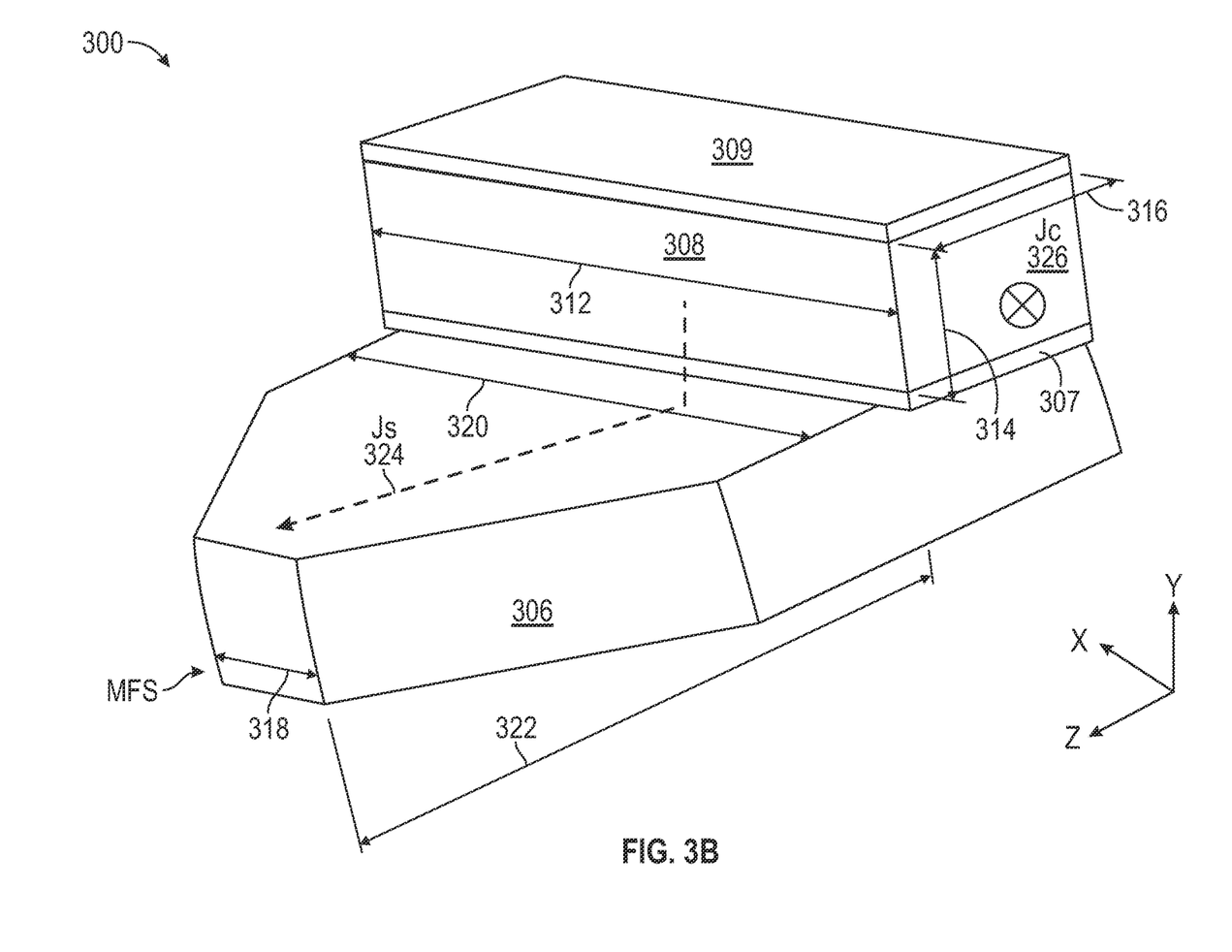
FIG. 3B illustrates a portion of the write head of FIG. 3A.

A spin orbit torque (SOT) layer 308, which may be referred to as a spin Hall layer or a spin Hall effect (SHE) layer, is disposed over a trailing shield facing surface 305 of the NM layer 306. As shown in FIG. 3B, a seed layer 307 is disposed between the SOT layer 308 and the NM layer 306, and a buffer layer 309 is disposed on the SOT layer 308. The seed layer 307 is disposed in contact with both the NM layer 306 and the SOT layer 308. The SOT layer 308 is recessed a distance 322 in the z-direction of about 20 nm to about 100 nm from the MFS, and the amount of recess in some embodiments is a distance equal or smaller than the spin diffusion length of non-magnetic spin transport layer 306. The SOT layer 308 and the NM layer 306 effectively function as a spintronic device for spin current injection/transporting. As shown in FIG. 3B, the SOT layer 308 has a length (L) 312 of around about 100 nm or more in the x-direction, a thickness (T) 314 of about 10 nm in the y-direction, and a width 316 of about 30 nm in the z-direction. The length 312 of the SOT layer 308 is significantly greater than the thickness 314 of the SOT layer 308. As such, a ratio of the length 312 to the thickness 314 (L/T) is greater than 1, such as greater than or equal to about 10.

In some embodiments, the SOT layer 308 has a (012) orientation to achieve the highest spin hall angle (current-spin conversion efficiency) and some appropriate buffer layer below and interlayer above (i.e., such that the SOT layer 308 is sandwiched between a buffer layer and an interlayer) to minimize diffusion and roughness. The converted spin-current 324 flows inside the NM layer 306 flows toward the MFS and causes a torque on the trailing shield 304 and main pole 302, which improves write-ability as discussed above. The SOT layer 308 may comprise undoped BiSb or doped BiSbX, where the dopant is less than about 10 at. %, and where X is extracted from elements which don't readily interact with Bi, such as B, N, Al, Si, Ti, V, Cr, Fe, Ni, Cu, Ge, Y, Zr, Ru, Mo, Ag, Hf, Ta, W, or Ir, or in alloy combinations with one or more of aforementioned elements, like CuAg, CuNi, RuGe, etc.

Numerous materials may be utilized as the seed layer 307 and the buffer layer 309 to provide a textured SOT layer 308 (012) growth using either textures (100) or as amorphous seed layers. One group of materials, Group A, includes body centered cubic (BCC) such as V, $V_3Al$, $Mn_3Al$, Nb, Mo, W, Ta, $WTi_{50}$, NiAl, RhAl, or in alloy combinations of these materials with similar lattice parameters, or a BCC material used in combination with (100) textured layers such as Cr (heated at about 250° C. or larger), RuAl, IrAl, CoAl, B2 phases, NiAl-B2 phase, CrMo (Mo of about 20-50 at. %)-A2, or B2 phase, A2 CrX (X is about 10 at. %, heated at about 250° C. or larger, and is selected from Ru, Ti, W, and Mo).

The Group A materials provide texturing for subsequent layers and may be referred to as a MgO (100) texturing layer stack. Generally speaking, depositing a high boron affinity elements or alloys such as alloys of tantalum, tungsten, or titanium and then depositing a magnetic layer containing boron, an amorphous magnetic layer material such as cobalt iron boron or cobalt boron is formed, but the boron would be pulled out leaving a magnetic cobalt iron or cobalt layer behind. On top of that layer, MgO could be formed with a (100) texture. Other manners to make MgO (100) can include depositing heated chromium or ruthenium aluminum grow in a textured fashion. MgO (100) texturing layer stacks can also be made by depositing thin MgO on a magnetic bilayer of Co, or CoFe on a magnetic boron alloy of CoFeB or CoB deposited on a thin high B gettering alloy seed layers of Hf, Ta, W, Ti, or alloys containing these elements.

Another group of materials, Group B, includes face centered cubic (FCC) oxide materials including FeO, CoO, NiO, ZrO, MgO, TiO, MgTiO, and MnO. Another group of materials, Group C, includes FCC nitrides and carbides including ScN, TiN, NbN, ZrN, HfN, TaN, VN, CrN, ScC, TiC, NbC, ZrC, HfC, TaC, WC, VC, and $W_{0.8}Zr_{0.2}C$. Group C materials can be deposited as amorphous to nanocrystalline thin films depending upon deposition conditions. Resistivities of Group C materials are >100-200 micro ohm-cm.

Another groups of materials, Group D, includes nonmagnetic Heusler materials including $Fe_2VAl$, $Cr_2CoAl$, CoTiSb, $Mn_2VSi$, $V_2Al$, $[Mn_{0.5}Co_{0.5}]_2VAl$, $[Mn_{0.75}Co_{0.25}]_2VSi$, CoMnNbAl, CoZrFeAl, and $Ti_2MnAl$. Another group of materials, Group E, are crystalline high polarization layers using magnetic alloys or Heusler alloys that have large spin polarizations and do not readily mix with a spin Hall layer including: $Co_2MnSb$, CoFeX, NiFeX, (where X is one or more of Si, Al, Mn, and Ge) CoFe, NiFe, $Co_2MnGe$, $CoMnSb$, $NiMnSb$, $Co_2FeGe$, $Co_2MnSn$, and $Co_2MnFeGe$. Another group of materials, Group F, includes amorphous nonmagnetic high resistive electrical shunt block layers that do not promote strong (012) BiSbX texture or growth. They include $SiO_2$, $Al_2O_3$, SiN, AlN, SiC, SiCrOx, NiX, FeX, and CoX, where X can be one or more of these elements including Fe, Co, Ni, Ta, Hf, W, Ir, Pt, Ti, Zr, N, Ru, Ge and/or B.

Another group of materials, Group G, includes any metal amorphous or ceramic amorphous material with the nearest neighbor x-ray diffraction peak in the 2.19 Å to 2.02 Å d-spacing range. Such materials include nonmagnetic and magnetic materials from Group A, D, or E which are laminated or alloyed with one or more elements of: Cu, Ag, Ge, Al, Mg, Si, Mn, Ni, Co, Mo, Zr, Y, Bi, Hf, Ta, W, Ir, Pt, Ti, or B. They form effectively nonmagnetic amorphous layers which produce amorphous materials or start with amorphous materials like a-Ge, and a-NiPX alloys (where X is one of Ru, Rh, Y, Zr, Mo, Hf, Ta, W, Re, Pt, or Ir), etc. Group G also may include amorphous/nanocrystalline alloys with a-Ge, a-NiP and one or more elements of: Cu, Ag, Ge, Al, Mg, Si, Mn, Ni, Co, Mo, Zr, Y, Bi, Hf, Ta, W, Ir, Pt, Ti, or B to promote a strong (012) BiSb texture.

Yet another group of materials, Group H, are high perpendicular magnetic anisotropy (PMA) materials that can be amorphous or crystalline materials. Amorphous rare-earth transition metals (RE-TM) that have high PMA like TbFeCo, TbFeB, Nd, Pr, Sm(Fe,Co)B or heavy metals like CoZrTaB can be used. This multilayer polycrystalline stacks of Co/Pt, Co/Pd, CoFe/Pt, Co/Tb, or CoFe/Tb ("/" denoting layer separation), or single layer PMA materials like CoPt, CoPtCr, CoFePt, and FePt with high Ku can be used with an amorphous high polarizing layer next to the spin Hall layer for (012) texture growth.

The NM layer 306 may comprise a non-magnetic material, such as Cu or Al. In one embodiment, the NM layer 306 may be a multilayer structure. The NM layer 306 has a thickness in the y-direction of about 10 nm. The SBL 310 may comprise a higher resistivity material and higher spin scattering/shorter spin diffusion length such that there will be no spin polarized current going to the trailing shield 304. For example, the SBL 310 may comprise Ti, Ru, a combination of Ti with Ru, Pt, or Mn, a combination of Ru with Pt or Mn, and alloys thereof, or some insulator material such as AlOx, SiN, or MgO, where x is an integer greater than or equal to 1. The SBL 310 has a thickness in the y-direction of about 2 nm to about 5 nm, a width in the z-direction of about similar to that of the NM layer 306, and a length in the x-direction of less than about 30 nm.

During operation, an electric current (Jc) 326 is injected and flows transverse to the plane in the x-direction through the SOT layer 308. Due to a higher spin hall angle (SHA), and hence electrical to spin current conversion efficiency, there will be pure spin current (Js) 324 generated that flows into the NM layer 306 from the SOT layer 308, down in the −y-direction toward the main pole 302 and then toward the MFS in the −z-direction, and then finally into the main pole 302 near the MFS, as shown in FIG. 3A. In other words, the SOT layer 308 injects a pure spin current 324 to the NM layer 306. The spin current 324 causes a torque on the main pole 302 when closer to the MFS side and hence improves write-ability as discussed above. The tapered shape of the NM layer 306 further concentrates the spin current 324 more into the small trailing gap 311 and further improves fast switching of the magnetization of the main pole during the writing process. The SBL 310 prevents any spin torque from acting on the trailing shield 304.

As shown in FIG. 3B, the NM layer 306 is tapered, where the NM layer 306 becomes smaller in size closer to the MFS, such as having a length 318 of about 15 nm to about 25 nm, to make the spin current 324 more concentrated at the tip 302a of the main pole 302. The SOT layer 308 is disposed on the longer portion of the NM layer 306 away from the MFS, such as having a length 320 of about 20 nm to about 100 nm, such that the SOT layer 308 has more overlap with the NM layer 306 for increased spin current generation due to the spin Hall effect. In some embodiments, the length 320 of the longer portion of the NM layer 306 is substantially the same as the length 312 of the SOT layer 308. By recessing the SOT layer 308, it is better protected from issues of head-media contact and heating which may degrade its reliability, and thus the write head 300 will also have increased reliability.

Figure 4:
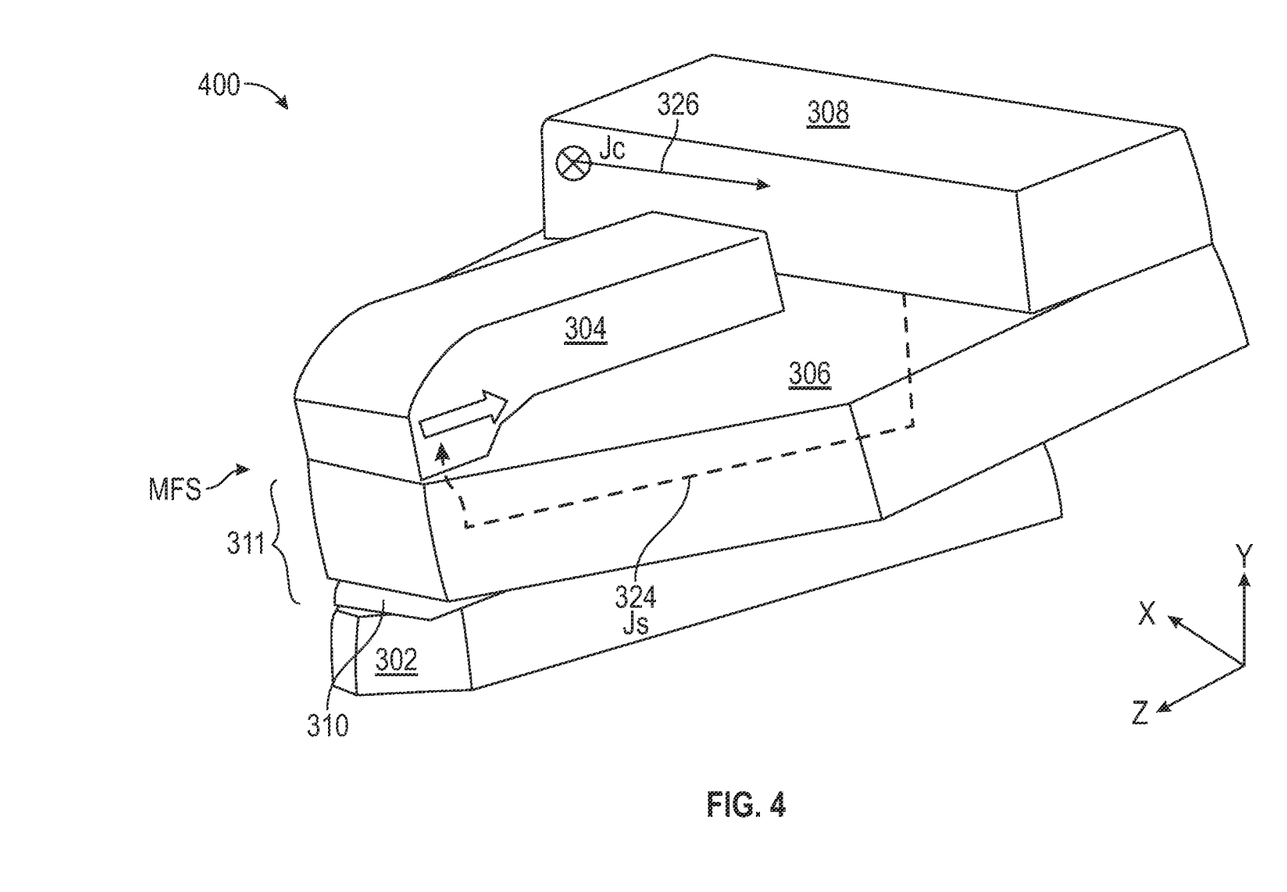
FIG. 4 illustrate prospective views of write heads, according to another embodiment.

The write head 400 of FIG. 4 is similar to the write head 300 of FIGS. 3A-3B; however, the SBL 310 is disposed between the main pole 302 and the NM layer 306, rather than between the trailing shield 304 and the NM layer 306. In some embodiments, insulating layers (not shown) may be disposed between portions of the trailing shield 304 and the NM layer 306, and/or between the main pole 302 and the NM layer 306, like discussed above. The materials and dimensions of each layer are the same as discussed above in FIGS. 3A-3B. For example, the SOT layer 308 has the same L/T ratio as in the write head 300, and is recessed the same distance 322. The SOT layer 308 and the NM layer 306 effectively function as a spintronic device. While not shown, the write head 400 comprises the seed layer 307 and the buffer layer 309, each disposed in contact with the SOT layer 308, similar to what is shown in FIG. 3B.

Because the location of the SBL 310 is different than in the write head 300, during operation of the write head 400, current (Jc) 326 is injected and flows transverse to the plane in the −x-direction through the SOT layer 308. The spin current (Js) 324 flows from the SOT layer 308 through the NM layer 306 to the trailing shield 304. The SOT layer 308 injects a pure spin current 324 to the NM layer 306. The spin current 324 is focused into the small trailing gap 311, which causes a torque on the trailing shield 304 and improves write-ability as discussed above. The SBL 310 prevents any spin torque from acting on the main pole 302. Thus, the write head 300 is assisted by the trailing shield 304 switching.

Figure 5:
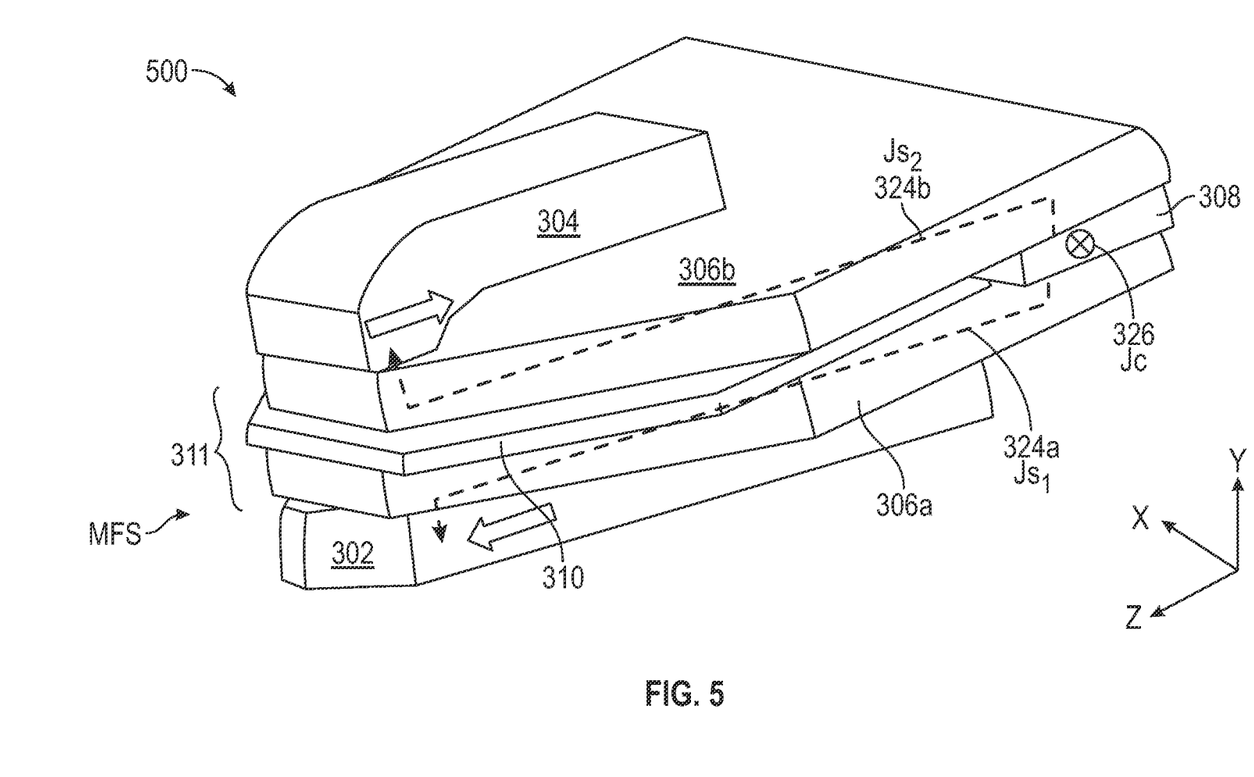
FIG. 5 illustrate prospective views of write heads, according to yet another embodiment.

The write head 500 of FIG. 5 is similar to the write head 300 of FIGS. 3A-3B and to the write head 400 of FIG. 4; however, the SOT layer 308 is disposed between a first NM layer 306a and a second NM layer 306b. In the write head 500, the first NM layer 306a is disposed on the main pole 302, the SOT layer 308 is disposed over the first NM layer 306a, the second NM layer 306b is disposed over the SOT layer 308, and the trailing shield 304 is disposed on the second NM layer 306b. The SBL 310 is disposed between the first NM layer 306a and the second NM layer 306b, and further between the SOT layer 308 and the MFS. The SOT layer 308 and the NM layers 306a, 306b effectively function as a spintronic device. While not shown, the write head 500 comprises the seed layer 307 and the buffer layer 309, each disposed in contact with the SOT layer 308.

In some embodiments, insulating layers (not shown) may be disposed between portions of the trailing shield 304 and the second NM layer 306b, between the main pole 302 and the first NM layer 306a, between the SBL 310 and the first NM layer 306a, between the SBL 310 and the second NM layer 306b, and between the SBL 310 and the SOT layer 308. As such, the SBL 310 may be spaced from the first NM layer 306a, the second NM layer 306b, and the SOT layer 308.

The materials and dimensions of some layers are the same as discussed above in FIGS. 3A-3B. For example, the SOT layer 308 has the same L/T ratio as in the write head 300, and is recessed the same distance 322. However, the width of the SBL 310 in the z-direction may be greater than in the write head 300 or 400. For example, the SBL 310 in the write head 500 may have a width extending from the MFS of about 20 nm to about 40 nm towards the SOT layer 308 of about 100 nm or more. Furthermore, both the first NM layer 306a and the second NM layer 306b may each individually comprise any of the materials listed above for the NM layer 306 of FIGS. 3A-4.

During operation of the write head 500, current (Jc) 326 is injected and flows transverse to the plane in the x-direction through the SOT layer 308. A first spin current ($Js_1$) 324a is induced and flows from the SOT layer 308 through the first NM layer 306a to the main pole 302, and a second spin current ($Js_2$) 324b is induced and flows from the SOT layer 308 through the second NM layer 306b to the trailing shield 304. The first spin current 324a flows out through the tip 302a of the main pole 302. The second spin current 324b flows out through the tip of the trailing shield 304. The SOT layer 308 injects a pure spin current to both the first and second NM layers 306a, 306b.

The first and second spin currents 324a, 324b are each individually focused into the small trailing gap 311, which causes torque on the trailing shield 304 and on the main pole 302, which improves write-ability as discussed above. The SBL 310 prevents any interactions between first spin current 324a and the second spin current 324b. Thus, the write head 500 is assisted by both the main pole 302 spin current switching and the trailing shield 304 spin current switching due to the utilization of the first and second NM layers 306a, 306b and the shared SOT layer 308 between them.

Figure 6:
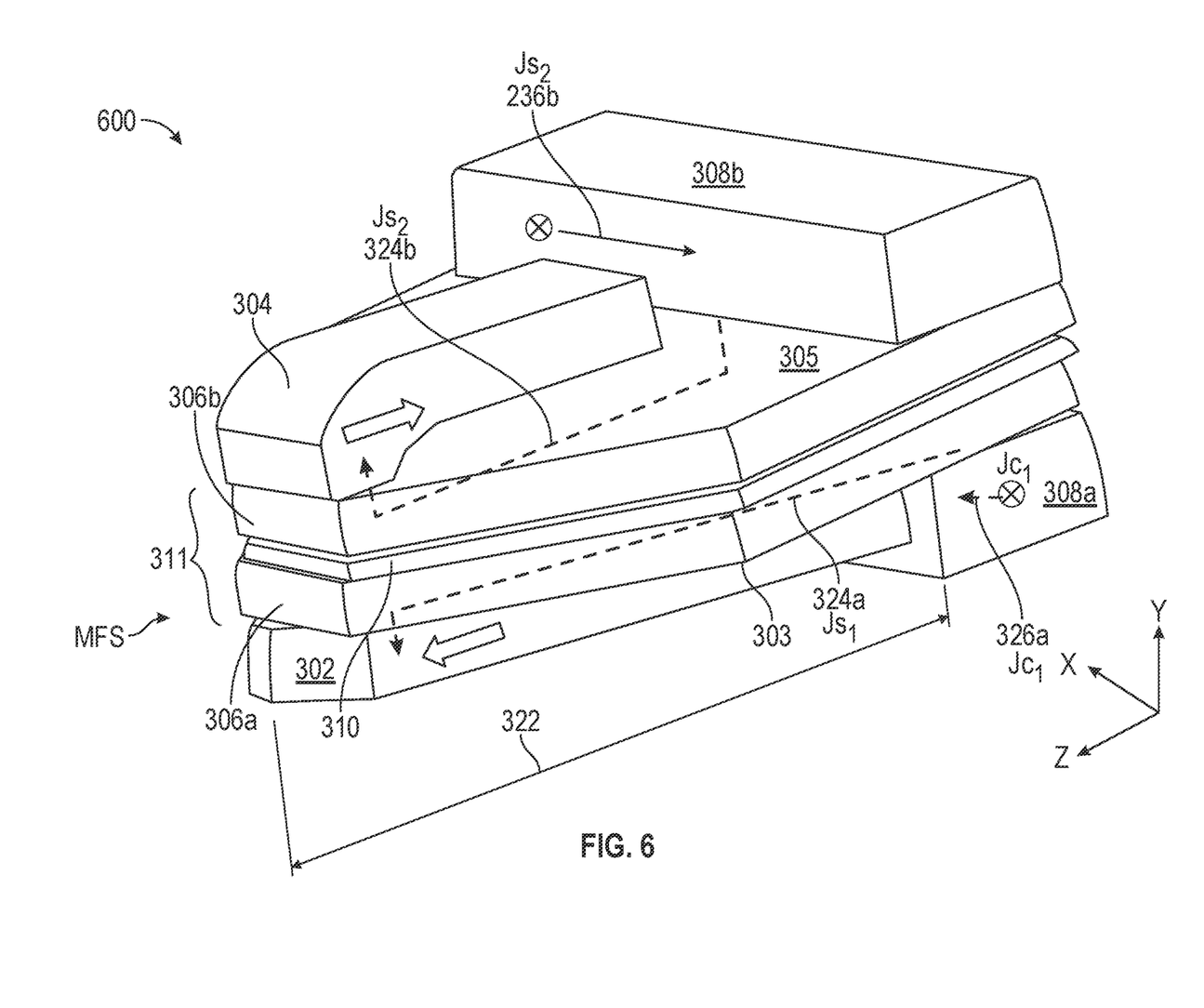
FIG. 6 illustrate prospective views of write heads, according to one embodiments.

The write head 600 of FIG. 6 is similar to the write head 500 of FIG. 5; however, the write head 600 comprises a first SOT layer 308a and a second SOT layer 308b. In the write head 600, the first NM layer 306a is disposed on the main pole 302, the first SOT layer 308a is disposed over a main pole facing surface 303 of the first NM layer 306a behind the main pole 302, the SBL 310 is disposed between the first NM layer 306a the second NM layer 306b, the trailing shield 304 is disposed on the second NM layer 306b, and the second SOT layer 307b is disposed over a trailing shield facing surface 305 of the second NM layer 306b behind the trailing shield 304. Both the first SOT layer 308a and the second SOT layer 308b are recessed the distance 322 from the MFS. While not shown, a portion of the main pole 302 may extend over and around the first SOT layer 308a, and a portion of the trailing shield 304 may extend over and around the second SOT layer 308b. The SOT layers 308a, 308b and the NM layers 306a, 306b effectively function as a spintronic device.

While not shown, the write head 600 comprises a seed layer 307 and a buffer layer 309 disposed in contact with each the SOT layer 308a, 308b. As such, the write head 600 comprises two seed layers 307 and two buffer layers 309, where each SOT layer 308a, 308b is sandwiched between a seed layer 307 and a buffer layer 309.

In some embodiments, insulating layers (not shown) may be disposed between portions of the trailing shield 304 and the second NM layer 306b, between the main pole 302 and the first NM layer 306a, and between the SBL 310 and the first and second NM layers 306a, 306b. As such, the SBL 310 may be spaced from the first NM layer 306a and the second NM layer 306b. Moreover, while not shown, one or more insulating layers may be disposed between the first SOT layer 308a and the main pole 302, and between the second SOT layer 308b and the trailing shield 304.

The materials and dimensions of each layer are the same as discussed above in FIGS. 3A-3B. For example, the SOT layer 308 has the same L/T ratio as in the write head 300, and is recessed the same distance 322. However, the height or width of the SBL 310 in the z-direction may be greater than in the write heads 300, 400, and/or 500. For example, the SBL 310 in the write head 600 may have a height extending from the MFS of about 20 nm to about 40 nm, which extends between the first and second SOT layers 308a, 308b. Furthermore, both the first NM layer 306a and the second NM layer 306b may each individually comprise any of the materials listed above for the NM layer 306 of FIGS. 3A-4, and both the first SOT layer 308a and the second SOT layer 308a may each individually comprise any of the materials listed above for the SOT layer 308 of FIGS. 3A-4.

During operation of the write head 600, a first current ($Jc_1$) 326a is injected and flows transverse to the plane in the x-direction through the first SOT layer 308a. A first spin current ($Js_1$) 324a flows from the first SOT layer 308a through the first NM layer 306a to the main pole 302. A second current ($Jc_2$) 326b is injected and flows transverse to the plane in the −x-direction through the second SOT layer 308b. A second spin current ($Js_2$) 324b flows from the second SOT layer 308b through the second NM layer 306b to the trailing shield 304. The first SOT layer 308a injects a pure spin current to the first NM layer 306b, and the second SOT layer 308b injects a pure spin current to the second NM layer 306b.

The first and second spin currents 324a, 324b are each individually focused into the small trailing gap 311, which increases spin current density and causes more torque on the trailing shield 304 and on the main pole 302, which improves write-ability as discussed above. The SBL 310 prevents any magnetic interactions between the first spin current 324a and the second spin current 324b. Thus, the write head 600 is driven by both the main pole 302 switching and the trailing shield 304 switching due to the utilization of the first and second NM layers 306a, 306b and the first and second SOT layers 308a, 308b.

Thus, by recessing the SOT layer(s) from the MFS, where the SOT layer(s) is disposed on and in contact with a larger NM layer that extends to the MFS, a higher spin current efficiency and an increased amount of spin current can be generated, and the spin current can be more concentrated at the MFS. As such, the main pole or the trailing shield can be switched faster than in conventional write heads having a SOT device at the MFS only and the write-ability is improved. Moreover, since the SOT layer(s) is recessed from the MFS, the SOT layer(s) experiences less stress and/or corrosion than SOT layers disposed at the MFS, resulting in the SOT layer(s) having increased reliability.

In one embodiment, a magnetic recording head comprises a main pole disposed at a media facing surface (MFS), a shield disposed at the MFS, a non-magnetic layer disposed between the main pole and the shield, the non-magnetic layer being disposed at the MFS, and a spin orbit torque (SOT) layer disposed over the non-magnetic layer, the SOT layer being recessed a distance equal or smaller than the spin diffusion length of non-magnetic spin transport layer 306, which is about 20 nm to about 100 nm or more from the MFS.

A ratio of a length of the SOT layer to a thickness of the SOT layer is greater than 1. The non-magnetic layer is tapered in shape, and wherein a length of the non-magnetic layer is substantially equal to a length of the SOT layer. The SOT layer comprises undoped BiSb or doped BiSbX, where the dopant is less than about 10 at. %, and where X is a material selected from the group consisting of: B, N, Al, Si, Ti, V, Cr, Fe, Ni, Cu, Ge, Y, Zr, Ru, Mo, Ag, Hf, Ta, W, and Ir. The magnetic recording head further comprises a spin blocking layer disposed between the shield and the non-magnetic layer, wherein the SOT layer is disposed on a side facing surface of the non-magnetic layer. The magnetic recording head further comprises a spin blocking layer disposed between the main pole and the non-magnetic layer, wherein the SOT layer is disposed on a main pole facing surface of the non-magnetic layer. A magnetic recording device comprises the magnetic recording head. The magnetic recording device further comprises a control unit configured to cause a current to flow through the SOT layer, and to cause a spin current to flow from the SOT layer through the non-magnetic layer to the main pole. The magnetic recording device further comprises a control unit configured to cause a current to flow through the SOT layer, and to cause a spin current to flow from the SOT layer through the non-magnetic layer to the shield.

In another embodiment, a magnetic recording head comprises a main pole disposed at a media facing surface (MFS), a first non-magnetic layer disposed over the main pole, the first non-magnetic layer being disposed at the MFS, a second non-magnetic layer disposed over the first non-magnetic layer, the second non-magnetic layer being disposed at the MFS, a trailing shield disposed over the second non-magnetic layer, and a spin orbit torque (SOT) layer disposed over the first non-magnetic layer and the second non-magnetic layer, the SOT layer being recessed a distance of about 20 nm to about 100 nm from the MFS.

A ratio of a length of the SOT layer to a thickness of the SOT layer is greater than 1, and wherein the SOT layer comprises undoped BiSb or doped BiSbX, where the dopant is less than about 10 at. %, and where X is a material selected from the group consisting of: B, N, Al, Si, Ti, V, Cr, Fe, Ni, Cu, Ge, Y, Zr, Ru, Mo, Ag, Hf, Ta, W, and Ir. The magnetic recording head further comprises a spin blocking layer disposed between the first non-magnetic layer and the second non-magnetic layer, the spin blocking layer being disposed at the MFS. The spin blocking layer comprises a material selected from the group consisting of: Ti, Ru, a bilayer of Ti with Ru, Pt, or Mn, a bilayer of Ru with Pt or Mn, and alloys thereof, AlOx, SiN, and MgO, where x is an integer greater than or equal to 1. The first and second non-magnetic layers each individually comprises Cu or Al. A magnetic recording device comprises the magnetic recording head. The magnetic recording device further comprises a control unit configured to cause a current to flow through the SOT layer, to cause a first spin current to flow from the SOT layer through the first non-magnetic layer to the main pole, and to cause a second spin current to flow from the SOT layer through the second non-magnetic layer to the trailing shield.

In yet another embodiment, a magnetic recording head comprises a main pole disposed at a media facing surface (MFS), a first non-magnetic layer disposed over the main pole, the first non-magnetic layer being disposed at the MFS, a spin blocking layer disposed over the first non-magnetic layer, a second non-magnetic layer disposed over the spin blocking layer, the second non-magnetic layer being disposed at the MFS, a trailing shield disposed over the second non-magnetic layer, a first spin orbit torque (SOT) layer disposed over the first non-magnetic layer, and a second SOT layer disposed over the second non-magnetic layer, wherein the first SOT layer and the second SOT layer are each individually recessed a distance of about 20 nm to about 100 nm from the MFS.

A ratio of a length of the first SOT layer to a thickness of the first SOT layer is greater than 1. A ratio of a length of the second SOT layer to a thickness of the second SOT layer is greater than 1. The first SOT layer and the second SOT layer each individually comprises BiSb. The first non-magnetic layer and the second non-magnetic layer are each individually tapered in shape, wherein the first SOT layer is disposed on a main pole facing surface of the first non-magnetic layer, and wherein the second SOT layer is disposed on a trailing shield facing surface of the second non-magnetic layer. The first non-magnetic layer and the second non-magnetic layer each individually comprises an oxide, a nitride, an amorphous nonmagnetic shunt block layer, or a metal with a nearest neighbor x-ray diffraction peak in a range of 2.19 Å to 2.02 Å d-spacing. The spin blocking layer extends between the first SOT layer and the second SOT layer. A magnetic recording device comprises the magnetic recording head. The magnetic recording device further comprises a control unit configured to cause a first current to flow through the first SOT layer, to cause a first spin current to flow from the first SOT layer through the first non-magnetic layer to the main pole, to cause a second current to flow through the second SOT layer, and to cause a second spin current is configured to flow from the second SOT layer through the second non-magnetic layer to the trailing shield.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole disposed at a media facing surface (MFS);
   a shield disposed at the MFS;
   a non-magnetic layer disposed between the main pole and the shield, the non-magnetic layer being disposed at the MFS, wherein the non-magnetic layer is tapered in shape; and
   a spin orbit torque (SOT) layer disposed over the non-magnetic layer, the SOT layer being recessed a distance of about 20 nm to about 100 nm from the MFS.

2. The magnetic recording head of claim 1, wherein a ratio of a length of the SOT layer to a thickness of the SOT layer is greater than 1.

3. The magnetic recording head of claim 1, wherein a length of the non-magnetic layer is substantially equal to a length of the SOT layer.

4. The magnetic recording head of claim 1, wherein the SOT layer comprises undoped BiSb.

5. The magnetic recording head of claim 1, wherein the SOT layer comprises doped BiSbX, where the dopant is less than about 10 at. %, and where X is a material selected from the group consisting of: B, N, Al, Si, Ti, V, Cr, Fe, Ni, Cu, Ge, Y, Zr, Ru, Mo, Ag, Hf, Ta, W, and Ir.

6. The magnetic recording head of claim 1, further comprising a spin blocking layer disposed between the shield and the non-magnetic layer, wherein the SOT layer is disposed on a trailing side facing surface of the non-magnetic layer.

7. The magnetic recording head of claim 1, further comprising a spin blocking layer disposed between the main pole and the non-magnetic layer, wherein the SOT layer is disposed on a trailing side facing surface of the non-magnetic layer.

8. A magnetic recording device comprising the magnetic recording head of claim 1.

9. The magnetic recording device of claim 8, further comprising a control unit configured to cause a current to flow through the SOT layer, to cause a first spin current to flow from the SOT layer through the non-magnetic layer to the main pole, and to cause a second spin current to flow from the SOT layer through a second non-magnetic layer to the shield.

10. A magnetic recording head, comprising:
a main pole disposed at a media facing surface (MFS);
a first non-magnetic layer disposed over the main pole, the first non-magnetic layer being disposed at the MFS;
a second non-magnetic layer disposed over the first non-magnetic layer, the second non-magnetic layer being disposed at the MFS, wherein the first non-magnetic layer and the second non-magnetic layer are each individually tapered in shape;
a shield disposed over the second non-magnetic layer; and
a spin orbit torque (SOT) layer disposed over the first non-magnetic layer and the second non-magnetic layer, the SOT layer being recessed a distance of about 20 nm to about 100 nm from the MFS.

11. The magnetic recording head of claim 10, wherein a ratio of a length of the SOT layer to a thickness of the SOT layer is greater than 1, and wherein the SOT layer comprises undoped BiSb or doped BiSbX, where the dopant is less than about 10 at. %, and where X is a material selected from the group consisting of: B, N, Al, Si, Ti, V, Cr, Fe, Ni, Cu, Ge, Y, Zr, Ru, Mo, Ag, Hf, Ta, W, and Ir.

12. The magnetic recording head of claim 10, further comprising a spin blocking layer disposed between the first non-magnetic layer and the second non- magnetic layer, the spin blocking layer being disposed at the MFS.

13. The magnetic recording head of claim 12, the spin blocking layer comprises a material selected from the group consisting of: Ti, Ru, a bilayer of Ti with Ru, Pt, or Mn, a bilayer of Ru with Pt or Mn, and alloys thereof, AlOx, SiN, and MgO, where x is an integer greater than or equal to 1.

14. The magnetic recording head of claim 10, wherein the first and second non-magnetic layers each individually comprises Cu or Al.

15. A magnetic recording device comprising the magnetic recording head of claim 10.

16. A magnetic recording head, comprising:
a main pole disposed at a media facing surface (MFS);
a first non-magnetic layer disposed over the main pole, the first non-magnetic layer being disposed at the MFS;
a spin blocking layer disposed over the first non-magnetic layer;
a second non-magnetic layer disposed over the spin blocking layer, the second non-magnetic layer being disposed at the MFS, wherein the first non-magnetic layer and the second non-magnetic layer are each individually tapered in shape;
a trailing shield disposed over the second non-magnetic layer;
a first spin orbit torque (SOT) layer disposed under the first non-magnetic layer; and
a second SOT layer disposed over the second non-magnetic layer, wherein the first SOT layer and the second SOT layer are each individually recessed a distance of about 20 nm to about 100 nm from the MFS.

17. The magnetic recording head of claim 16, wherein a ratio of a length of the first SOT layer to a thickness of the first SOT layer is greater than 1, wherein a ratio of a length of the second SOT layer to a thickness of the second SOT layer is greater than 1, and wherein the first SOT layer and the second SOT layer each individually comprises BiSb.

18. The magnetic recording head of claim 16, wherein the first SOT layer is disposed on a main pole facing surface of the first non-magnetic layer, and wherein the second SOT layer is disposed on a trailing shield facing surface of the second non-magnetic layer.

19. The magnetic recording head of claim 16, wherein the spin blocking layer extends between the first SOT layer and the second SOT layer.

20. A magnetic recording device comprising the magnetic recording head of claim 16.

21. The magnetic recording device of claim 20, further comprising a control unit configured to cause a first current to flow through the first SOT layer, to cause a first spin current to flow from the first SOT layer through the first non-magnetic layer to the main pole, to cause a second current to flow through the second SOT layer, and to cause a second spin current to flow from the second SOT layer through the second non- magnetic layer to the trailing shield.

22. A magnetic recording device comprising:
a magnetic recording head, comprising:
a main pole disposed at a media facing surface (MFS);
a shield disposed at the MFS;
a non-magnetic layer disposed between the main pole and the shield, the non-magnetic layer being disposed at the MFS; and
a spin orbit torque (SOT) layer disposed over the non-magnetic layer, the SOT layer being recessed a distance of about 20 nm to about 100 nm from the MFS; and
a control unit configured to cause a current to flow through the SOT layer, to cause a spin current to flow from the SOT layer through the non-magnetic layer to the main pole.

23. A magnetic recording device comprising:
a magnetic recording head, comprising:
a main pole disposed at a media facing surface (MFS);
a shield disposed at the MFS;
a non-magnetic layer disposed between the main pole and the shield, the non-magnetic layer being disposed at the MFS; and
a spin orbit torque (SOT) layer disposed over the non-magnetic layer, the SOT layer being recessed a distance of about 20 nm to about 100 nm from the MFS; and
a control unit configured to cause a current to flow through the SOT layer, to cause a spin current to flow from the SOT layer through the non-magnetic layer to the shield.

* * * * *